United States Patent
Potash et al.

(10) Patent No.: US 10,151,772 B2
(45) Date of Patent: Dec. 11, 2018

(54) HOT WIRE ANEMOMETER

(71) Applicant: Embry-Riddle Aeronautical University, Inc., Daytona Beach, FL (US)

(72) Inventors: Michael S. Potash, Ormond Beach, FL (US); Albert D. Helfrick, Deland, FL (US)

(73) Assignee: Embry-Riddle Aeronautical Univeristy, Inc., Daytona Beach, FL (US)

( * ) Notice: Subject to any disclaimer, the term of this patent is extended or adjusted under 35 U.S.C. 154(b) by 290 days.

(21) Appl. No.: 15/003,850

(22) Filed: Jan. 22, 2016

(65) Prior Publication Data

US 2016/0216292 A1 Jul. 28, 2016

Related U.S. Application Data

(60) Provisional application No. 62/106,981, filed on Jan. 23, 2015.

(51) Int. Cl.
*G01P 21/02* (2006.01)
*G01P 5/12* (2006.01)

(52) U.S. Cl.
CPC .............. *G01P 21/025* (2013.01); *G01P 5/12* (2013.01)

(58) Field of Classification Search
CPC .......... G01F 1/6845; G01F 1/692; G01F 1/69; G01F 1/6847; G01F 1/684; G01F 1/6986;
(Continued)

(56) References Cited

U.S. PATENT DOCUMENTS 3,803,913 A * 4/1974 Tracer ....................... G01F 1/68
   73/204.14
4,685,324 A * 8/1987 Bourdon ............... G01F 1/6965
   73/1.34
(Continued)

FOREIGN PATENT DOCUMENTS

FR         2570829 A1    3/1986
KR      100758039 B1    9/2007

OTHER PUBLICATIONS

Osorio et al., Latin American Applied Research, vol. 40, No. 3, "Fabrication of hot-wire probes and electronics for constant temperature anemometers".
(Continued)

*Primary Examiner* — John Fitzgerald
*Assistant Examiner* — Truong D Phan
(74) *Attorney, Agent, or Firm* — Womble Bond Dickinson (US) LLP

(57) ABSTRACT

A hot wire anemometer circuit has a calibrate subcircuit and an operate subcircuit which are selectively invoked via a user-activate mode switch. The calibrate subcircuit includes a detector configured to compare an amplified sensor voltage with an amplified drive voltage and output an indicator signal when the two voltages match. The drive voltage is derived from a user-adjusted drive resistance of a bridge subcircuit. The operate circuit includes a feedback loop which provides a signal to a bride node of a bridge circuit. After a sensor is connected to the anemometer circuit, the drive resistance is adjusted until the indicator signal is produced, signifying that the circuit is tuned and impedances are matched to prevent oscillations. A slewing network protects the sensor by shorting the drive resistance upon switching the anemometer circuit to the calibrate mode from
(Continued)

the operate mode, and gradually restoring the drive resistance when switching back.

10 Claims, 3 Drawing Sheets

(58) Field of Classification Search
CPC ........ G01F 1/698; G01F 1/696; G01F 1/6965;
G01F 1/6842; G01F 1/688; G01F 1/68;
G01F 1/6888; G01F 1/28; G01F 1/20;
G01F 1/00; G01F 1/64; G01F 1/56; G01F
1/74; G01F 1/90; F02D 41/187; G01P
21/025; G01P 5/10; G01P 5/12; G01P
5/07; F03D 11/0091; F05B 2260/821;
G01R 27/2611; G01R 17/00; G01R
27/02; G01R 27/2605; G01R 17/105;
G01R 27/18; G01D 5/2412
USPC ............... 73/204.14–204.27, 170.11–170.16,
73/861.85, 861.71, 861.08, 863.03, 1.29;
324/657, 725, 706
See application file for complete search history.

(56) References Cited

U.S. PATENT DOCUMENTS

| | | | |
|---|---|---|---|
| 5,094,105 A | | 3/1992 | Emmert, Jr. et al. |
| 5,231,878 A | | 8/1993 | Zanini-Fisher et al. |
| 5,419,190 A | | 5/1995 | Boyd |
| 5,656,938 A | * | 8/1997 | Bennohr ................. G01F 1/698 |
| | | | 324/706 |
| 5,710,380 A | * | 1/1998 | Talley ....................... G01P 5/12 |
| | | | 73/861.85 |
| 6,370,950 B1 | * | 4/2002 | Lammerink ............ G01F 1/699 |
| | | | 73/204.15 |
| 6,470,741 B1 | * | 10/2002 | Fathollahzadeh ..... G01F 1/6965 |
| | | | 73/204.15 |
| 6,539,792 B2 | | 4/2003 | Lull et al. |
| 6,543,282 B1 | | 4/2003 | Thompson |
| 6,639,506 B1 | | 10/2003 | Landis |
| 6,684,695 B1 | | 2/2004 | Fralick et al. |
| 6,769,299 B2 | | 8/2004 | Forster et al. |
| 6,904,799 B2 | | 6/2005 | Cohen et al. |
| 6,905,242 B2 | | 6/2005 | Heuer et al. |
| 7,082,824 B2 | | 8/2006 | Lull |
| 8,336,544 B2 | | 12/2012 | Downie |
| 8,813,551 B2 | | 8/2014 | Boiarski |
| 2002/0043104 A1 | * | 4/2002 | Lammerink ............ G01F 1/699 |
| | | | 73/204.15 |
| 2004/0100289 A1 | * | 5/2004 | Lull ....................... G01F 1/6847 |
| | | | 324/693 |
| 2005/0109100 A1 | * | 5/2005 | Eldridge ............... G01F 1/6965 |
| | | | 73/204.18 |
| 2008/0066541 A1 | * | 3/2008 | Burton .................. G01F 1/6965 |
| | | | 73/204.15 |
| 2010/0168738 A1 | * | 7/2010 | Schneider .......... A61B 18/1206 |
| | | | 606/41 |

OTHER PUBLICATIONS

Garmimlla R. Sarma, "Analysis of a Constant Voltage Anemometer Circuit", 1993 IEEE, pp. 731-736, Analytical Services and Materials, Inc., 107 Research Drive, Hampton, VA 23666 US.

N.B.Wood, "A Method for Determination and Control of the Frequency Response of the Constant-temperature Hot-Wire Anemometer", J. Fluid Mech. (1975), vol. 67, part 4, pp. 769-786, Central Electricity Research Laboratories, Leatherhead, Surrey, England, Printed in Great Britain.

W. Gale Biggs, "Measurement and Analysis of the Structure of Turbulence Near the Ground with a Hot Wire Anemometer System", The University of Michigan College of Engineering, Department of Meteorology and Oceanography, Grant No. DOD-DA-AMC-27-021-63-G7, and National Science Foundation Grant No. G-22388, Office of Research Administration, Ann Arbor, Jun. 1966, pp. 1-58, http://deepblue.lib.umich.edu/bitstream/handle/2027.42/3600/ang2685.0 . . . .

* cited by examiner

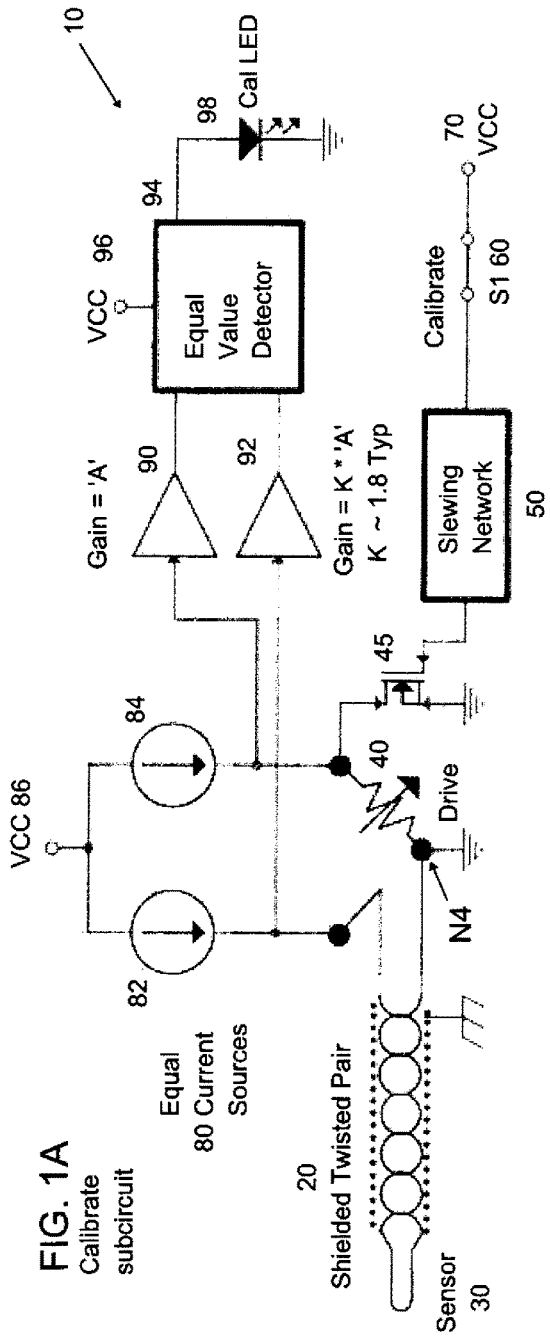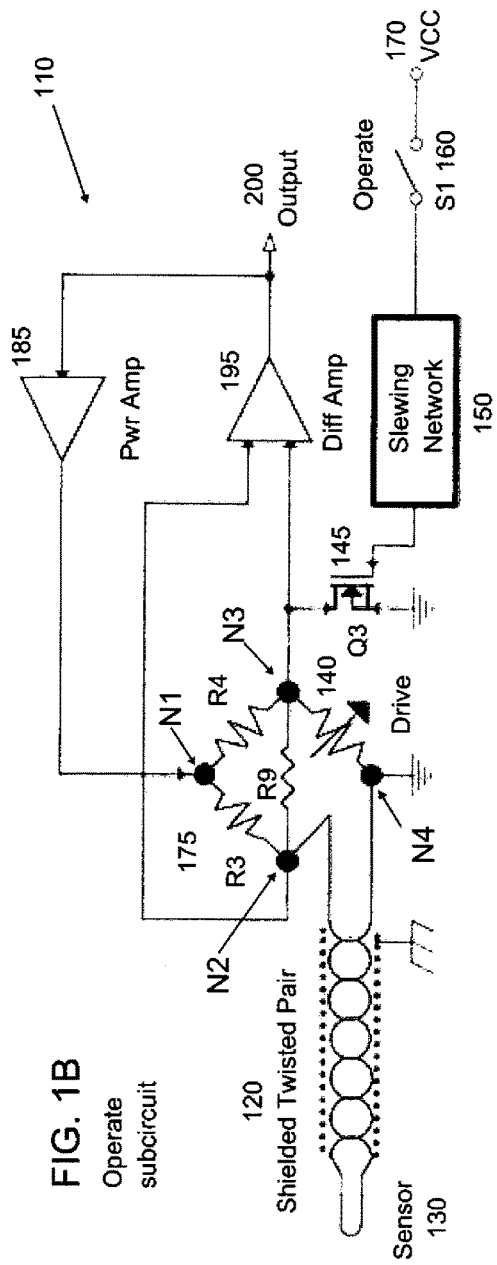
FIG. 1A Calibrate subcircuit
FIG. 1B Operate subcircuit

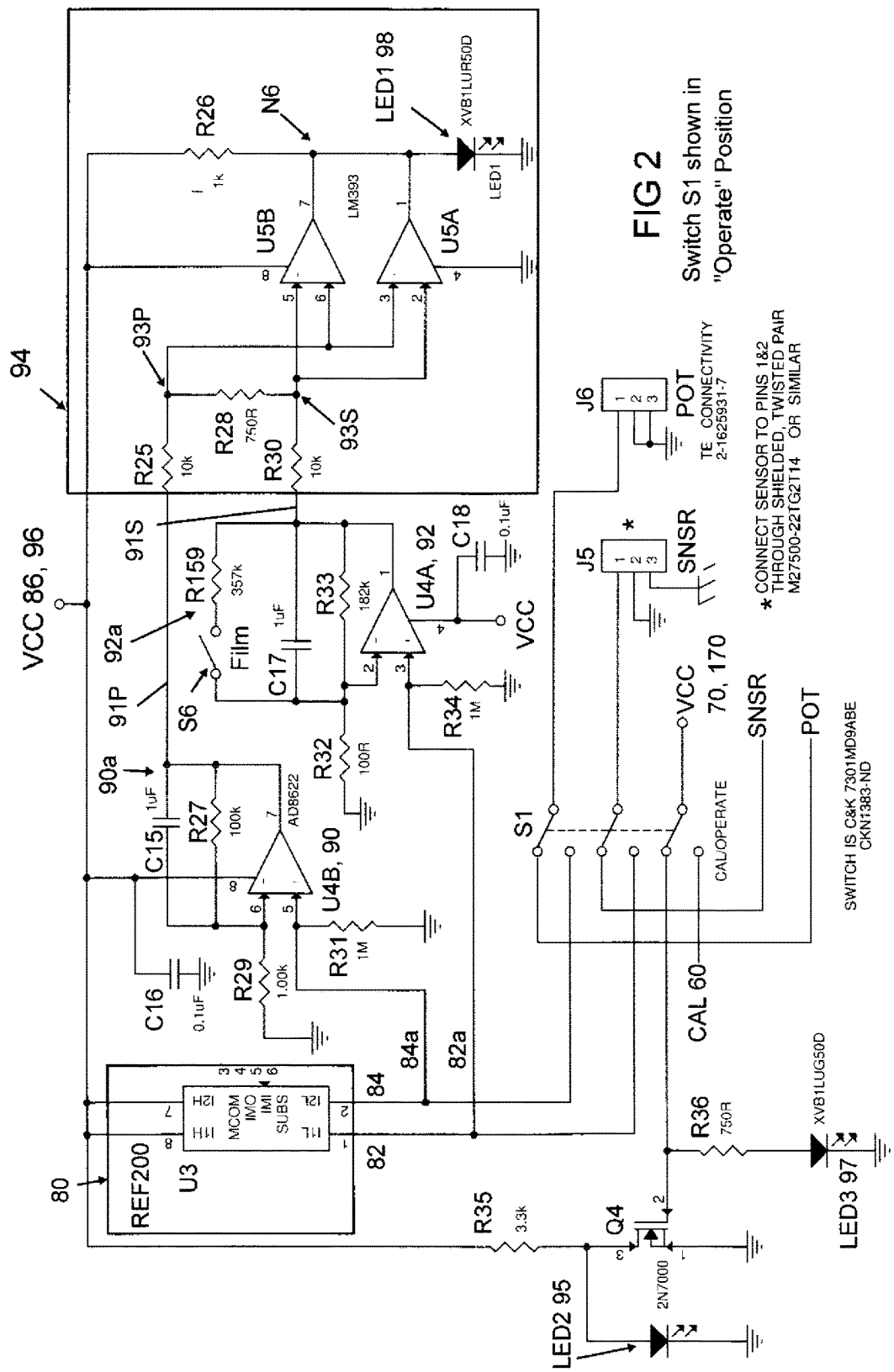

HOT WIRE ANEMOMETER

CROSS REFERENCE TO RELATED APPLICATIONS

The present Patent Application is a formalization of previously filed, U.S. Provisional Patent Application Ser. No. 62/106,981, filed Jan. 23, 2015 by the inventors named in the present Application. This Patent Application claims the benefit of the filing date of this cited Provisional Patent Application according to the statutes and rules governing provisional patent applications, particularly 35 U.S.C. § 119(e), and 37 C.F.R. §§ 1.78(a)(3) and 1.78(a)(4). The specification and drawings of the Provisional Patent Application referenced above are specifically incorporated herein by reference as if set forth in their entirety.

FIELD OF THE INVENTION

The present invention is directed to an improved design of a hot-wire or hot-film anemometer.

BACKGROUND

By way of background, anemometers measure the flow of fluids and take many forms. For macro measurements such as wind velocity, wind turbine and wind vanes are common. For measurements requiring a small sensor for profiling and other applications, a popular device is the hot wire or hot film anemometer. This configuration exploits the resistive temperature coefficient of materials by fabricating them into thin film or wire sensors. Additionally, these sensors may be oriented 90 degrees to each other to provide three orthogonal components of the fluid velocity vector. In practice, the sensor is heated to a temperature above ambient. As the sensing element is cooled by fluid flow, energy is carried away, lowering the temperature and causing a change in resistance. This change in resistance is quite small and therefore significant amplification is required to develop a useful signal for measurement.

There are three common methods of heating the wire and measuring its resistance: the constant voltage, the constant current, and the constant temperature method. All three of these methods use a feedback control system to maintain a parameter that is kept constant. All methods involve sensing the voltage across the heated element and use the sensed voltage for controlling the loop or making measurements. However, existing constant temperature hot wire/film anemometer designs are plagued by three particular issues, namely:
1. The need to adjust system damping—which the operator must perform for each channel and with every change of sensor or cable.
2. The process for adjusting the system to achieve proper sensor drive is cumbersome and can itself be destructive of the hot wire/film sensor element.
3. The frequent destruction of the delicate and expensive sensors from endemic current surges.

Each of these problems will be discussed in detail herein below.

Issue #1, adjustment of system damping is an elaborate and essentially unnecessary process to minimize, but not eliminate, system instabilities. The hot wire or film to be sensed is part of a probe used for measuring fluid flow at a specific location and orientation. Because the point of sensing is remote from the point of data acquisition, connections between sensors and signal processing hardware exists, facilitated with cabling.

Some form of shielded wire is used to prevent noise pickup in the interconnection between sensors and signal processing electronics. Coaxial cable and twisted pairs are used at audio frequencies in many home and commercial installations. At higher frequencies, shielded wires exhibit transmission line characteristics such as the reflection of energy if the wires are not properly fed and terminated.

The bandwidth of many hot wire/film anemometers is similar to the audio frequency range of 20 Hz to 20 kHz and transmission line effects are not considered. However, the control loops that are used to create the constant current, voltage, or temperature have bandwidths well exceeding the audio frequency range. The wires between the sensor and circuits therefore constitute a transmission line and must be treated as such. An improperly fed or terminated transmission line is capable of exhibiting time delay effects and can present a complex impedance; i.e. having a reactive component. The confluence of sensor, cable, and circuit can then satisfy the Barkhausen Criteria, pushing the circuitry into oscillation. This is the reason for the complicated process to adjust the damping, partially stabilizing the system. However, if the sensor or cable is exchanged, the frequency of oscillation shifts, and the tuning process must be repeated.

A control loop with a complex impedance present at any point is subject to instabilities. While hot wire or film anemometer systems have employed additional components and lengthy procedures to mitigate ringing of an underdamped system as well as other effects, these attempted solutions have not eliminated such problems.

Issue #2, the cumbersome process for setting the sensor drive, exists because of the need to adjust the drive based upon the cold resistance of the individual sensor. Typically, the drive resistance is set to approximately 1.8 times the cold resistance of the sensor. When the unit is energized, the bridge excitation increases to heat the sensor to raise its resistance to match the drive resistance. Existing designs require measuring the sensor cold resistance, performing the necessary mathematics, and then adjusting the drive setting resistance to the necessary value to achieve the desired drive. This is typically done either by disconnecting and reconnecting components or, by using expensive resistor switching units with numerical displays that must be set accordingly.

Issue #3, the too-frequent destruction of the sensor element from circuit transients, results from the propensity of existing hot-wire anemometer designs to produce and transmit large and fast current spikes to the connected sensor. This occurs when the sensor parameters are changed too quickly or functions are performed 'out of sequence'.

The present invention provides an anemometer design that encompasses three new circuit topologies addressing these and other problems in the art.

Those skilled in the art will appreciate the above stated advantages and other advantages and benefits of various additional embodiments upon reading the following detailed description of the embodiments with reference to the below-listed drawing figure.

According to common practice, the various features of the drawing discussed below are not necessarily drawn to scale. Dimensions of various features and elements in the drawings may be expanded or reduced to more clearly illustrate the embodiments of the disclosure.

BRIEF DESCRIPTION OF THE FIGURES

FIG. 1A shows a block diagram of the anemometer circuit when in the calibrate mode, showing the calibrate subcircuit.

FIG. 1B shows a block diagram of the anemometer circuit when in the operate mode, showing the operate subcircuit.

FIG. 2 shows a detailed implementation of the calibrate subcircuit.

DETAILED DESCRIPTION

Figure 3:
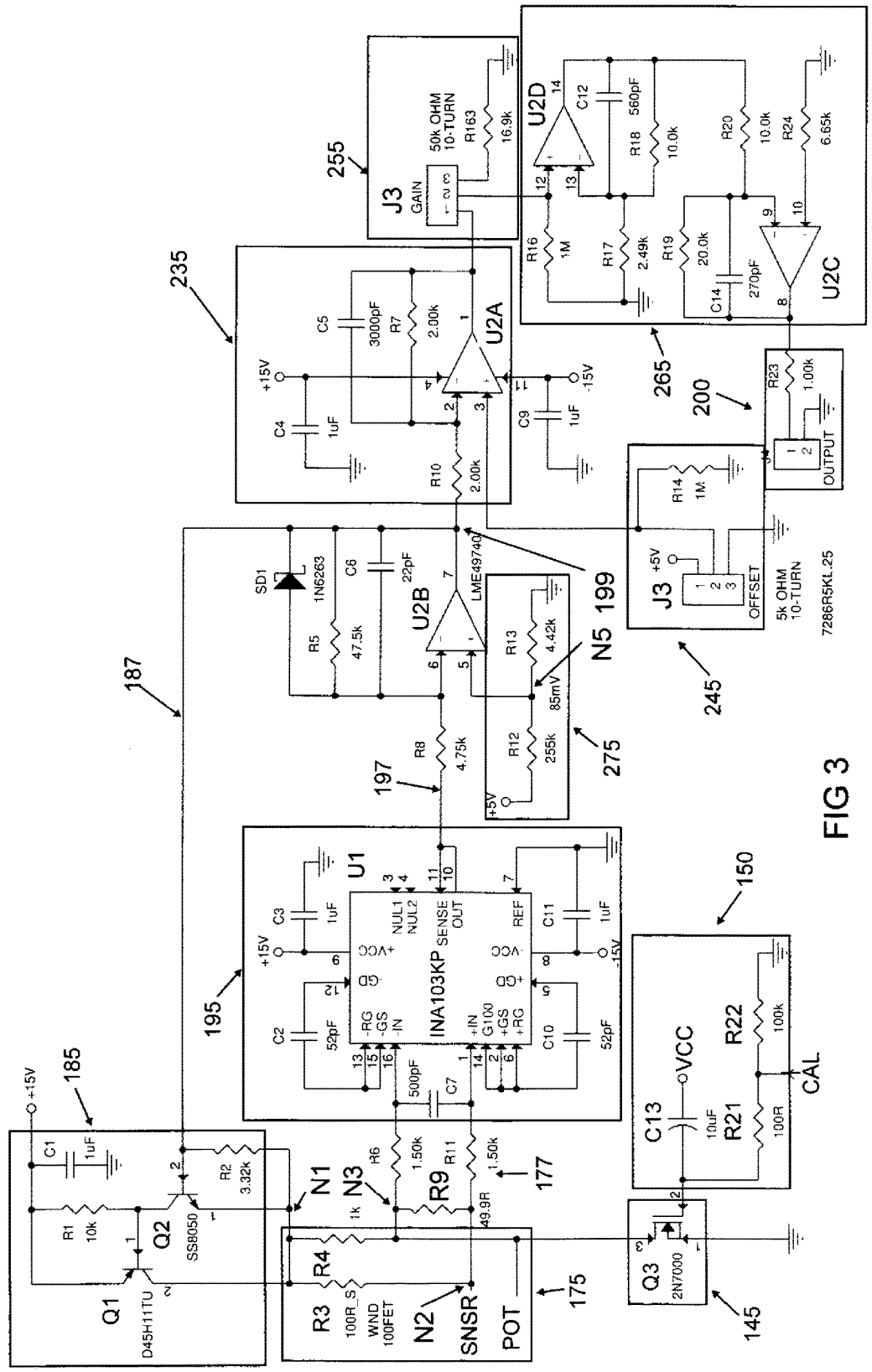
FIG. 3 shows a detailed implementation of the operate subcircuit.

The present invention eliminates the instabilities for any configuration of sensor and transmission line by considering the physics of transmission lines and insuring proper termination to prevent reflections and complex impedances. Referring to the block diagram of FIG. 1, a constant temperature system is shown.

FIG. 1A shows a system in calibrate mode at 10 and FIG. 1B shows the system in operate mode in 110. With like numbers representing similar elements between the modes shown at 10 and at 110, a shielded, twisted pair is shown at 20 and 120, a sensor 30 and 130, a tunable drive potentiometer 40 and 140, a switching transistor at 45 and 145, a slewing network at 50 and 150, a switch 60 and 160, and supply voltage VCC, the ground-referenced, positive voltage supply used to energize the indicated circuitry at 70 and 170. In calibrate mode, the switch 60 is closed, while in operate mode the switch 160 is open.

In the calibrate mode of FIG. 1A, the system is shown with equal current sources at 82 and 84, Supply voltage VCC 86, operational amplifiers 90, 92 with appropriate feedback for scaling the voltage signals developed across the sensor and drive setting resistor, an equal value detector at 94, Supply voltage VCC 96 and a visual indicator at 98. As shown at 90, the GAIN is equal to 'A' and as shown at 92, the GAIN is equal to K*'A' with K=1.8 TYP, which is described above.

The switching transistor Q3 shown at 45 and 145, the slewing network shown at 50 and 150, and the switching element shown at 60 and 160 as depicted in FIGS. 1A and 1B constitute a protection system to limit transient electrical events that can destroy the delicate sensor element. The slewing network can be active or passive linear or non-linear, and functions to control the switching element depicted in FIGS. 1A and 1B as a transistor Q3 145. The slewing network circuitry 50, 150 is configured such that the switching element shorts the drive resistance when destructive events occur; bringing the drive to zero, and then gently slews to relieve the short once such an event is concluded, allowing the drive to resume at an acceptable level.

The sensor element is connected to the control system by use of a controlled characteristic impedance transmission line, which could be a twisted pair, shielded or unshielded, or a coaxial cable. This system can be adapted to any type of controlled impedance cable including Twinax, Triax, double shielded, etc. These cables are common and used for high speed data transmission and radio communication— applications that involve high frequencies and are subject to distortion from reflections. However, as shown in FIGS. 1A and 1B, optimal results are achieved utilizing a shielded, twisted pair which comprises a differential signal source with all the advantages of common-mode noise rejection.

The resistance of the hot wire or film sensor 30, 130 will not be close to the characteristic impedance of practical transmission lines and therefore will not present a matched source impedance. The addition of resistance is unattractive because of the resulting signal loss and, because sensor impedance is dynamic and therefore not amenable to the selection of a specific component. This system accepts that the source (i.e. the hot wire or film sensor 30, 130) is not impedance matched to the transmission line 20, 120 and an alternate method of eliminating the effects of reflections is used.

The operate mode shown in the block diagram of FIG. 1B shows a Wheatstone bridge 175. Connected across the Wheatstone bridge 175 is termination resistor R9 which is equal to the characteristic impedance of the transmission line 20, 120. Because the transmission line 20, 120 is terminated with its characteristic impedance at the amplifier 195, reflections from any source can make only one pass through the transmission line 20, 120 before being completely absorbed by the termination resistor R9. This termination resistor R9 does not cause significant signal reduction because of the high loop gain. The transmission line 20, 120 is connected to the summing junction N1 of the feedback loop, which is known as a virtual ground, i.e. both inputs of the differential amplifier 195 are practically at the same potential. At higher frequencies (i.e. those above the bandwidth of the control loop) this node ceases to function as virtual ground as the control loop runs out of gain. With the diminution of the virtual ground, the termination resistor R6 presents a limit to the amplifier impedance and thereby inhibits the circuit from going into oscillation. Additionally, as shown in the Operate Mode of FIG. 1B, a power amplifier 185 to drive the Wheatstone Bridge 175 and a differential amplifier 195 to achieve necessary loop gain are referenced and function as required for a constant temperature design.

FIG. 2 shows one portion of a specific circuit implementation of the inventive anemometer.

In FIG. 2, Switch S1 allows for selection between the operate mode and the calibrate mode. In FIG. 2, Switch S1 is in the operate position. When in the operate position, supply voltage VCC causes current to flow through resistor R36 and on to ground. This turns on operate mode LED3 97, indicating that the device is in the operate mode. Supply voltage VCC also prevents transistor Q4 from conducting, and so calibrate mode LED2 95 is off. Also when in the operate position, switch S1 routes the sensor output signal SNSR at connector J5 and the drive resistance signal POT at connector J6 to the Wheatstone bridge 175.

FIG. 3 shows a specific implementation of the Whetstone bridge 175, along with the principal components used by the anemometer when in the operate mode.

The Whetstone Bridge 175 includes first, second, third and fourth nodes N1, N2, N3, N4, respectively. The ends of first and second bridge resistors R3, R4 meet at the first node N1. The termination resistor R9 is connected between nodes N2, N3 and therefore is connected across first and second bridge resistors R3, R4. In the operate subcircuit, the drive potentiometer 140 is connected between the third node N3 and the fourth (ground) node N4. At third node N3, the drive potentiometer presents a drive resistance signal POT. Meanwhile, the sensor 30, 130 output is connected to node N2 via the transmission line 20, 120, where is presents the sensor output signal SNSR. Excitation for the Whetstone Bridge 175 is provided by the feedback (power) amplifier 185 which is implemented as a complementary pair of power transistors Q1, Q2, the latter of whose base is controlled by a feedback signal 187.

Adjusting the drive potentiometer 140 to the typical value of 1.8× the cold resistance of the sensor 30, 130 produces a differential voltage at the bridge output across termination resistor R9. This voltage is presented to the differential inputs of instrumentation amplifier U1 (which serves as the differential amplifier 195) via first amplifier input circuit 177. In the shown embodiment, the instrumentation amplifier U1 is implemented as an INA103KP. The differential voltage is amplified by the instrumentation amplifier U1 to produce first amplified output signal 197. In the shown embodiment, the first amplified output signal 197 is input to a second amplifier U2B, where it is further amplified. Second amplifier U2B may constitute one of the four op amps of a LM49740 quad amplifier. The output of second amplifier U2B is a second amplified output signal 199. Second amplified outlet signal 199 is used as the feedback signal 187 applied to the base of transistor Q2 of the feedback amplifier 185.

As long as the resistance of the drive potentiometer 140 is higher than the resistance of the sensor 30, 130, the feedback signal 187 will become more positive. This has the effect of increasing the drive to the bridge 175, raising the temperature of the sensor 30, 130. As the temperature of the sensor 30, 130 increases, its resistance will increase until it matches that of the drive potentiometer 140. In this manner, the feedback loop will work to maintain the sensor 30, 130 at a constant temperature. Air moving past the sensor 30, 130, in carrying away heat, is met with a change in potential at the output of amplifier U2B which closely tracks the variations of the air movement. This is the basis of anemometer operation.

The termination resistor R9, by virtue of being connected across the input terminals of instrumentation amplifier U1, is capable of absorbing reflections that develop on the transmission line 20, 120 connecting the sensor to the instrument. Such reflections develop due to impedance mismatch between the sensor 20, 120, transmission line 30, 130, and the instrument amplifier U1 under the conditions of a high-bandwidth feedback loop. In contrast to prior art designs which attempt to manage the instability, the present design removes the source of the instability. However, it should be noted that instrumentation amplifier, U1, cannot respond unless there is some excitation on the bridge 175 to produce a voltage differential in the first instance.

The first amplified output 197 of instrumentation amplifier U1 is just one input to the second amplifier U2B. The other input to the second amplifier U2B is provided by a reference voltage from at fifth node N5, which belongs to a voltage divider 275. The reference voltage at fifth node N5 is amplified by U2B to provide the minimal excitation needed to set the process in motion.

The second amplified output 199 from the second amplifier U2B constitutes a varying amplified anemometer signal which is subjected to additional conditioning and amplification before it matures into the anemometer output signal 200.

The second amplified output 199 from the second amplifier U2B is applied as a first input to a third, inverting amplifier U2A circuit 235. A DC offset is applied to the second input of the third amplifier U2A. More particularly, at the third amplifier U2A, the DC offset is added to the second amplified output 199. As shown in FIG. 3, the DC offset may be supplied by a DC offset circuit 245 connectable to a potentiometer (via connector J3). Such an adjustable DC offset allows the user to selectively place the steady-state output on the zero axis, above, or below.

The output of the third, inverting amplifier U2A may be subjected to additional adjustable gain, as needed. The additional gain may be provided by adjustable gain amplifier 265 which in the shown embodiment comprises fourth and fifth amplifiers U2C and U2D, also belonging to the LME49740 quad op amp. Gain may be adjusted by a gain control circuit 255 comprising a potentiometer connected via connector J1. The adjustable gain amplifier 265 outputs the anemometer output signal 200 which may then be used for monitoring, display, control, and other uses.

Slewing network 150 is responsive to signal CAL, which is active when the switch S1 is moved from the operate mode of FIG. 1B to the calibrate mode of FIG. 1A. The slewing network 150 helps mitigate most transient events that tend to destroy the delicate sensors. Such events include connecting and disconnecting sensors, as well as switching between calibration and operation modes.

Slewing network 150 includes a voltage divider comprising resistors R21, R22 and a capacitor C13. When S1 is moved to the calibrate position, the supply voltage VCC is applied to the gate of Q3 in FIG. 3, shorting the drive potentiometer input which removes the drive potentiometer 140 from the sensor 30. At the same time, C13 is discharged, as both terminals are connected to the same potential. Returning S1 to the Operate position allows C1 to charge through R21 and R22. This action slowly returns the gate of Q3 to ground potential, allowing the feedback loop to respond to the setting on the drive potentiometer 140.

If switch S1 is in the operate position seen in FIG. 2 and then is pressed, it assumes the calibrate position. When this happens, supply voltage VCC 70, 170 no longer connects to resistor R36 and so operate mode LED3 turns off. However supply voltage VCC 86 causes a current to flow through resistor R35 and transistor Q4, thereby allowing calibrate mode LED2 95 to turn on, indicating that the unit is in calibrate mode.

In the calibrate mode, the sensor 30 and the drive potentiometer are each connected to precise, stable current sources which in the shown embodiment are implemented by a REF200 dual current source 80. Dual current source 80 has low-side constant current terminals 82, 84 which are connected to the sensor 30 and the drive potentiometer 40, respectively. Also, sensor 30 is connected via line 82a to the primary voltage input of sensor (first) gain amplifier U4A 92 while the drive potentiometer 40 is connected via line 84a to the primary voltage input of the potentiometer (second) gain amplifier U4B 90.

In the embodiment shown, the sensor and potentiometer gain amplifiers U4A, U4B are implemented using an AD8622 dual op amp, with clamping capacitors C18, C16 helping stabilize the supply voltage VCC 96. Anti-biasing resistors R31, R34 are connected to ground at the primary voltage inputs of U4A, U4B.

Potentiometer gain amplifier U4B 90, which outputs an amplified potentiometer voltage 91P, is provided with a second feedback network 90a. Second feedback network 90a includes capacitor C15 connected in parallel with permanent feedback resistor R27. The inverting input of U4B is also connected to ground via resistor R29. Potentiometer gain amplifier U4B 90 and its second feedback network 90a are configured to amplify the voltage developed across the drive potentiometer 140 by a factor of about 100×. The sensor gain amplifier U4A 92, which outputs an amplified sensor voltage 91S, is provided with a first feedback network 92a. First feedback network 92a includes capacitor C17 connected in parallel with permanent feedback resistor R33. The inverting input of U4A is connected to ground via resistor R32. However, the first feedback network 92a also includes a selectively actuated auxiliary feedback resistor R159 controlled by selector switch S6. Senor gain amplifier U4A 92 and its second feedback network 92a are thus configured to amplify the voltage developed across the sensor 30 by a factor that depends on the position of selector switch S6, and output the amplified sensor voltage 91S.

When selector switch S6 is open, as seen in FIG. 2, the auxiliary feedback resistor R159 is not part of the first feedback network 92a. With the sensor-type switch S6 open, amplifier U4A 92 and its first feedback network 92a are configured to amplify the voltage developed across the sensor 30 by a factor of about 180×, and so the unit is configured to employ a hot wire anemometer sensor.

On the other hand, when selector switch S6 is closed, the auxiliary feedback resistor R159 is included in the first feedback network, in parallel with permanent feedback resistor R33, thus dropping the effective resistance of the first feedback network 92a. With the sensor-type switch S6 closed, amplifier U4A 92 and its first feedback network 92a are configured to amplify the voltage developed across the sensor 30 by a factor of about 120×, and so the unit is configured to employ a hot film anemometer sensor.

Thus, if selector switch S6 is open (i.e., a hot wire anemometer is employed as the sensor 30, in order to get the voltage outputs of gain amplifiers U4A and U4B to match, the resistance of the drive potentiometer 140 must equal about 1.8× that of the cold sensor 30. On the other hand, if the selector switch S6 is closed (i.e., a hot film anemometer is employed as the sensor 30), in order to get the voltage outputs of gain amplifiers U4A and U4B to match, the resistance of the drive potentiometer 140 must equal about 1.2× that of the cold sensor 30.

To know when a specific ratio of the sensor and potentiometer resistances has been achieved, the amplified potentiometer voltage 91P and the amplified sensor voltage 91S (i.e., the outputs of gain amplifiers U4A and U4B) are applied to an equal-voltage detector circuit 94.

The amplified voltages 91P, 91S are first subject to a differential resistor network comprising sensor line resistors R25, R30 and differential resistor R28 connected across the line resistors R25, R39. This network simply reduces the sensitivity of the equal voltage detector, making adjustment easier. Differences in the amplified voltages 91P, 91S are reflected by the voltage across resistor R28, thereby producing comparator drive voltage input 93P and comparator sensor voltage input 93S.

The equal-voltage detector circuit 94 utilizes dual comparators U5A, U5B with open collector outputs connected to sixth node N6, located between resistor R26 and LED1 98. In the embodiment of FIG. 2, an LM393 dual differential comparator is used to implement the comparators. The circuit exploits the fact that for the comparator output to change states, there must be a slight voltage differential between the inputs. One comparator will pull the output low when the inputs are unbalanced in one direction; the other comparator with pull the output low when the imbalance is in the other direction. The only time neither comparator output goes low, is when both inputs are equal. When this balance is achieved, current flows through resistor R26, thereby turning on LED1 98 to indicate that the drive potentiometer has been properly set. Once the drive potentiometer 140 has been set and the circuit tuned, the switch S1 is returned to the operate position.

The present design replaces the entire measurement/calculation task with the simple push of a button and adjustment of the drive resistance. The operator pushes the 'Cal/Operate' switch and adjusts the drive resistance until the 'Cal' LED illuminates—after which the operator will push the Cal/Operate button again. Referencing FIG. 1A for the calibration mode, both the sensor 30 and the drive potentiometer 40 are routed to equal current sources 82, 84. The voltage across each element is, by Ohm's Law, equal to the source current multiplied by their respective resistances.

As mentioned above, it is desired that the sensor 30 is driven until its hot resistance is about 1.8 times its cold resistance. To achieve this, the gain of the sensor-sourced amplifier 92 is programmed to be K=1.8 times that of the drive-sourced amplifier 90. When the outputs of the amplifiers match, the drive potentiometer 40 is set to the desired resistance. When this match is achieved, the equal voltage detector 94 outputs an indicator signal, in this instance to illuminate an LED 98, indicating that the proper setting has been achieved. It is not necessary for the user to know what that resistance is; only that the drive is now set appropriately. Multiple scaling factors can be provided by adding a rotary or other, similar type of switch with gain-determining resistors of differing values.

The present design incorporates power slewing circuitry that mitigates most occurrences of rapid spiking. Referring to FIG. 1B illustrating the operating mode function, a slewing network controls a circuit element (here, a Field-Effect Transistor (FET) Q3) placed across the drive resistance. The slewing network in conjunction with the FET places a short circuit across the drive potentiometer 140 which is relieved slowly during transient or transitional events.

Power spikes are thus ignored—sidestepping sensor shock and thereby reducing sensor mortality. The specific components and their interconnections do not themselves constitute the advancement, but rather the implementation of strategic time constants that function to suppress transient events to the sensor without compromising the acquisition of data.

The foregoing description of the disclosure illustrates and describes various embodiments of the present invention. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments of the present invention that are within the scope of the claims.

Additionally, while the disclosure shows and describes only selected embodiments of the present invention, it will be understood that the present invention further is capable of use in various other combinations and environments, and is capable of various changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. An anemometer circuit connectable to a sensor, the anemometer circuit being selectively switchable between a calibrate mode and an operate mode, the anemometer circuit comprising:
   a mode selection switch configured to switch the anemometer circuit between the calibrate mode and the operate mode;
   a calibrate subcircuit energized in the calibrate mode;
   an operate subcircuit energized in the operate mode; and
   a bridge subcircuit in communication with the operate subcircuit,
      wherein the bridge subcircuit includes:
         a first node, a second node, a third node, and a fourth node, wherein the fourth node is a ground node;

a first bridge resistance connected between the first and second nodes;

a second bridge resistance connected between the first and third nodes;

a termination resistance connected between the second node and the third node; and an adjustable drive resistance connected between the third node and the fourth node, the adjustable drive resistance configured to present a drive resistance signal at the third node; wherein the second node is configured to receive a sensor output signal when connected to the sensor, wherein the operate subcircuit receives input from the bridge subcircuit and is configured to:

amplify a voltage difference between the sensor output signal and the drive resistance signal, when the sensor is connected to the anemometer circuit; and output an anemometer output signal in response thereto, and wherein the calibrate subcircuit calibrates the anemometer circuit, and comprises:

a first constant current source connected to the sensor to thereby produce a first sensor voltage;

a second constant current source connected to the adjustable drive resistance to thereby produce a first drive voltage;

a first gain amplifier configured to amplify the first sensor voltage by a first gain to produce an amplified sensor voltage;

a second gain amplifier configured to amplify the first drive voltage by a second gain to produce an amplified drive voltage;

a detector configured to compare the amplified sensor voltage and the amplified drive voltage and output an indicator signal, if the amplified sensor voltage matches the amplified drive voltage; and a ratio K of the first gain to the second gain is >1.0.

2. The anemometer circuit according to claim 1, wherein: the sensor is connected to the bridge subcircuit via a transmission line; and the termination resistor provides terminating impedance matching that of the transmission line.

3. The anemometer circuit according to claim 1, wherein: wherein the sensor is a hot wire anemometer sensor connected to the second node; and wherein the ratio K is 1.8.

4. The anemometer circuit according to claim 1, wherein: wherein the sensor is a hot film anemometer sensor connected to the second node; and wherein the ratio K is 1.2.

5. The anemometer circuit according to claim 1, further comprising:

a first feedback network associated with the first gain amplifier, the first feedback network comprising a sensor-type switch, activation of which changes a resistance of the first feedback network, and thereby changes said ratio K.

6. The anemometer circuit according to claim 1, wherein: the operate subcircuit comprises a feedback loop comprising amplifier circuitry configured to receive the sensor output signal and the drive resistance signal, and provide a bridge feedback signal in response thereto, to the first node of the bridge subcircuit; and the feedback loop comprises:

a differential amplifier configured to output a first feedback signal; and a power amplifier configured to amplify the first feedback signal prior to forming the bridge feedback signal.

7. The anemometer circuit according to claim 1, further comprising a slewing network configured to control current changes through the sensor.

8. The anemometer circuit according to claim 7, wherein the slewing network is configured to:

short the adjustable drive resistance, upon switching the anemometer circuit to the calibrate mode from the operate mode; and gradually restore the drive resistance between the third node and the fourth node, upon switching the anemometer circuit to the operate mode from the calibrate mode.

9. The anemometer circuit according to claim 1, wherein the detector comprises a light-emitting diode (LED) which illuminates when the amplified sensor voltage matches the amplified drive voltage.

10. The anemometer circuit according to claim 9, wherein the detector further comprises:

a resistor connected between a supply voltage and the LED; and first and second comparators having outputs connected to a node located between the resistor and the LED; wherein:

the amplified sensor voltage and the amplified drive voltage are input to both comparators.

* * * * *